United States Patent
Lee et al.

(10) Patent No.: US 7,911,577 B2
(45) Date of Patent: *Mar. 22, 2011

(54) PLANE SWITCHING MODE LIQUID CRYSTAL DISPLAY DEVICE HAVING IMPROVED CONTRAST RATIO

(75) Inventors: Min-Jic Lee, Daegu (KR); Chang-Hoon Lee, Jung-Ri (KR); Hee-Dong Choi, Jung-Ri (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/421,328

(22) Filed: Apr. 9, 2009

(65) Prior Publication Data

US 2009/0190083 A1 Jul. 30, 2009

Related U.S. Application Data

(62) Division of application No. 11/126,958, filed on May 10, 2005, now Pat. No. 7,535,533.

(30) Foreign Application Priority Data

May 10, 2004 (KR) .................................. 32746/2004

(51) Int. Cl.
*G02F 1/1339* (2006.01)
(52) U.S. Cl. .......... 349/155; 349/141; 349/156; 349/157
(58) Field of Classification Search .................... None
See application file for complete search history.

(56) References Cited

U.S. PATENT DOCUMENTS

| 6,097,467 A * | 8/2000 | Fujimaki et al. ............... 349/155 |
| 6,433,852 B1 | 8/2002 | Sonoda et al. |
| 6,445,437 B1 * | 9/2002 | Miyazaki et al. .............. 349/156 |
| 6,897,918 B1 * | 5/2005 | Nonaka et al. ................. 349/106 |
| 7,362,400 B2 | 4/2008 | Itou et al. |
| 7,492,435 B2 * | 2/2009 | Jeon ............................... 349/155 |
| 7,535,533 B2 * | 5/2009 | Lee et al. ....................... 349/141 |
| 2002/0063839 A1 | 5/2002 | Matsumoto |

(Continued)

FOREIGN PATENT DOCUMENTS

EP 1335240 4/2001

(Continued)

OTHER PUBLICATIONS

Combined Search and Examination Report issued in corresponding British Patent Application No. 0509132.7; dated Feb. 9, 2006.

(Continued)

*Primary Examiner* — David Nelms
*Assistant Examiner* — Thanh-Nhan P Nguyen
(74) *Attorney, Agent, or Firm* — Brinks Hofer Gilson & Lione

(57) ABSTRACT

An in-plane mode liquid crystal display device (LCD) is provided that is capable of improving a contrast ratio by blocking a light leakage region formed by a column spacer. The LCD includes gate and data lines that are formed on a substrate and cross each other to define pixels. A switching device, parallel first and second electrodes that generate a horizontal electric field, and a column spacer are disposed at each pixel. The column spacers are disposed between opposing substrates and are aligned with black matrix or the data lines such that the columns formed by the column spacers overlap with bent portions of the data lines.

8 Claims, 8 Drawing Sheets

U.S. PATENT DOCUMENTS

| | | | |
|---|---|---|---|
| 2002/0093617 A1 | 7/2002 | Matsuyama et al. | |
| 2002/0113935 A1* | 8/2002 | Yanagawa et al. | 349/155 |
| 2003/0151716 A1 | 8/2003 | Yanagawa et al. | |
| 2004/0032557 A1* | 2/2004 | Lee et al. | 349/141 |
| 2004/0041976 A1 | 3/2004 | Kida et al. | |
| 2004/0057005 A1* | 3/2004 | Matsumoto et al. | 349/141 |
| 2004/0227891 A1 | 11/2004 | Hirota | |
| 2004/0233378 A1 | 11/2004 | Okamoto et al. | |
| 2004/0263766 A1* | 12/2004 | Lee et al. | 349/156 |
| 2005/0237472 A1* | 10/2005 | Shibahara et al. | 349/167 |

FOREIGN PATENT DOCUMENTS

| | | |
|---|---|---|
| JP | 2000-227598 | 8/2000 |
| JP | 2003-280000 | 10/2003 |
| JP | 2004-046123 | 2/2004 |
| JP | 2004-109794 | 4/2004 |
| KR | 10-2004-0026808 | 4/2004 |

OTHER PUBLICATIONS

Office Action issued in corresponding Korean Patent Application No. 10-2004-0032746; dated Apr. 11, 2006.

Search Report issued in corresponding British Patent Application No. 0509132.7; dated Aug. 1, 2006.

Search Report issued in corresponding British Patent Application No. 0620924.1; dated Dec. 20, 2006.

Office Action issued in corresponding Japanese Patent Application No. 2005-137193; mailed May 28, 2008.

* cited by examiner

PLANE SWITCHING MODE LIQUID CRYSTAL DISPLAY DEVICE HAVING IMPROVED CONTRAST RATIO

RELATED APPLICATIONS

The present patent document is a Divisional of application Ser. No. 11/126,958, filed May 10, 2005, which claims the benefit of Korean Application No. 2004-32746 filed on May 10, 2004. Both of the foregoing applications are hereby incorporated by reference.

TECHNICAL FIELD

The present invention relates to an in-plane switching mode (IPS) liquid crystal display (LCD) device, and more particularly, to an in-plane switching mode LCD device capable of improving a contrast ratio by preventing light leakage through an alignment defective region resulting from a column spacer when rubbing an alignment layer by aligning the column spacer and a data line.

BACKGROUND OF THE INVENTION

With the development of various portable electronic devices such as mobile phones, PDAs and notebook computers, the demand for a light, thin and small flat panel display device is recently increasing. Research is actively being conducted for flat panel display devices such as an LCD (Liquid Crystal Display), a PDP (Plasma Display Panel), an FED (Field Emission Display), a VFD (Vacuum Fluorescent Display), or the like. Of them, the LCD device receives much attention due to its simple mass-production technique, easy driving system and high picture quality.

The LCD device has various display modes according to the arrangements of liquid crystal molecules. A TN-mode (Twisted Nematic Mode) LCD device has widely been used due to such advantages as high contrast ratio, rapid response time and low driving voltage. In such a TN mode LCD device, when a voltage is applied to liquid crystal molecules horizontally aligned with two substrates, the liquid crystal molecules rotate and then are almost vertically aligned with the two substrates. Accordingly, when a voltage is applied, the viewing angle of the TN mode LCD device becomes narrow due to a refractive anisotropy of the liquid crystal molecules.

To solve such a narrow viewing angle problem, various kinds of modes of the LCD device having a wide viewing angle have recently been proposed. Among them, an IPS-mode (In-Plane Switching Mode) LCD device is actually being mass-produced. The IPS-mode LCD device aligns liquid crystal molecules on a plane by forming at least a pair of electrodes in parallel with each other in a pixel and then forming a horizontal electric field substantially parallel with the surface of the substrate between the two electrodes.

FIG. 1 illustrates a structure of the above-described IPS-mode LCD device. As shown in FIG. 1, an IPS-mode LCD has a structure that electrodes disposed in one pixel and forming a horizontal electric field are bent. The electrodes are bent to divide a pixel into two domains, thereby improving a viewing angle characteristic.

As shown in FIG. 1, a gate line 3 and a data line 4 disposed vertically and horizontally define a pixel of an liquid crystal panel 1. Although only one pixel, $(n, m)^{th}$ pixel, is illustrated in FIG. 1, the liquid crystal panel 1 has 'N(>n)' number of the gate lines 3 and 'M(>m)' number of the data lines 4, and thus has 'N×M' number of pixels. At this time, the data line 4 is bent at a certain angle and symmetrically arranged with respect to the center of the pixel.

A thin film transistor 10 is formed near the crossing of the gate line 3 and the data line 4. The thin film transistor 10 includes: a gate electrode 11 to which a scan signal from the gate line 3 is applied; a semiconductor layer 12 formed on the gate electrode 11 and forming a channel layer, which is activated when the scan signal is applied; a source electrode 13 and a drain electrode 14 formed on the semiconductor layer 12, to which an image signal inputted from the outside is applied through the data line 4.

A Common electrode 5 and a pixel electrode 7 formed in a zigzag shape and arranged substantially parallel with the data line 4 are disposed in the pixel. In addition, a common line 16 connected to the common electrode 5 is disposed at an upper part of the pixel, and a pixel electrode line 17 connected to the pixel electrode 7 is disposed on the common line 16 and overlaps the common line 16.

A column spacer 18 for maintaining a uniform cell gap of the liquid crystal panel is formed on the gate line 3 on the left side of the data line 4.

Referring to FIG. 2, the IPS-mode LCD device having such a structure will be described in more detail. As shown in FIG. 2, the gate electrode 11 is formed on a first substrate 20 and a gate insulating layer 22 is formed on the gate electrode 11. The semiconductor layer 12 is formed on the gate insulating layer 22, and the source electrode 13 and the drain electrode 14 are formed on the semiconductor layer 12. A passivation layer 24 is formed over the first substrate 20.

The common electrode 5 is disposed on the first substrate 20 and the pixel electrode 7 is disposed on the gate insulating layer 22, so that a horizontal electric field is generated between the common electrode 5 and the pixel electrode 7.

A black matrix 32 and a color filter layer 34 are formed on a second substrate 30. The black matrix 32 where liquid crystal molecules do not operate is provided to prevent light leakage, and is mainly formed on the thin film transistor 10 region and between the pixels (i.e., regions of gate lines and data lines). The color filter layer 34 including R (Red), B (Blue) and G (Green) color filters is provided to display colors. In addition, the column spacer 18 is formed between the first substrate 20 and the second substrate 30 to maintain a uniform cell gap of the liquid crystal panel 1.

In general, a ball spacer having a ball shape is widely used as a spacer. The ball spacers are distributed by being dispersed onto the substrate. When the spacers are dispersed, it is difficult to uniformly distribute the ball spacers on the substrate, and besides a precise cell gap cannot be maintained if the ball spacers are lumped. In addition, since the ball spacers themselves diffuse light which transmits a liquid crystal layer, they result in deterioration of image quality of an LCD device. To solve such a problem, the above-described column spacer is used. However, the column spacer 18 may cause the following problems.

Though not shown in FIG. 2, an alignment layer is applied to the first substrate 20 and the second substrate 30. The alignment layer has an align direction by a rubbing process. In the rubbing process, the align direction is determined by rubbing a rubbing roll having a rubbing cloth against the alignment layer to thereby form grooves on the alignment layer. Accordingly, a region where grooves are not formed by the rubbing is formed around the column spacer 18 which has almost the same height as the cell gap of the liquid crystal panel 1. In such a region, liquid crystal molecules are arranged in an irregular direction (i.e., alignment defective region) and light leakage occurs in a normally black mode.

Meanwhile, as shown in FIG. 1, when the common electrode 5 and the pixel electrode 7 are arranged at a certain angle with respect to a direction of the Y-axis and are symmetric in the pixel, the rubbing is performed along the direction of the Y-axis of the data line 4. Accordingly, when the column spacer 18 is arranged on the left side of the data line 4, a light leakage region in a band shape occurs on the left side of the data line 4 in the direction of the Y-axis, resulting in deterioration of an LCD display.

SUMMARY OF THE INVENTION

An in-plane mode (IPS) display device presented that is capable of improving a contrast ration by preventing light leakage occurring through an alignment defective region by disposing a column spacer along a black matrix.

By way of introduction only, as embodied and broadly described herein, in one aspect of the present invention, an in-plane mode display device comprises: a first substrate; a plurality of data lines substantially perpendicularly crossing the gate lines to define a plurality of pixels; a switching device at each pixel in a set of pixels; at one pair of electrodes in each pixel in the set of pixels to form a horizontal electric field substantially parallel with a surface of the first substrate; and a plurality of column spacers between the first substrate and the second substrate, column spacers of the set of pixels aligned in columns substantially perpendicular to the gate lines such that each column formed by the column spacers overlaps at least a portion of the data line most proximate to the column.

In another embodiment, an in-plane switching mode display device comprises a first substrate and a second substrate of a plurality of gate lines on the first substrate to define a plurality of pixels. At each pixel is disposed: a switching device; at least one first electrode and at least one second electrode disposed substantially parallel each other to form a horizontal electric field substantially parallel each other to form a horizontal electric field substantially parallel with a surface of the first substrate; and a column spacer disposed between the first substrate and the second substrate. The data line most proximate to the data line is bent at least once and the column spacer is disposed adjacent to the data line in an area where a bent portion of the data line is convex.

In another embodiment, an in-planes switching mode device comprises a first substrate and a second substrate and a plurality of gate lines and a plurality of data lines formed on the first substrate to define a plurality of pixels. At each pixel is disposed: a switching device; at least one pair of electrodes to form a horizontal electric field substantially parallel with a surface of the first substrate; and a column spacer at the crossing of the gate line and the data line.

In another embodiment, an in-plane switching mode display device comprises a first substrate and a second substrate and plurality of gate lines and a plurality of data lines on the first substrate to define a plurality of pixels. At each pixel is disposed; a switching device; at least one pair of electrodes at the pixel forms a horizontal electric field substantially parallel with a surface of the first substrate; a black matrix on the second substrate that blocks light; and a column spacer between the first substrate and the second substrate, the column spacer being aligned with the black matrix.

In another embodiment, an in-plane switching mode display device comprises a first substrate and a second substrate and a plurality of gate lines and a plurality of data lines on the first substrate substantially perpendicularly crossing to define a plurality of pixels. At each pixel is disposed: a switching device; at least one pair of electrodes to form a horizontal electric field substantially parallel with a surface of the first substrate; and a column spacer between the first substrate and the second substrate. Each data line has a bent portion and the column spacer is aligned with the bent portion.

The foregoing and other features and aspects of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENTS

Reference will now be made in detail to the preferred embodiments of the present invention, examples of which are illustrated in the accompanying drawings.

Improving the contrast ratio is reduced when using the column spacers improves the quality of large-area IPS-mode liquid crystal display devices. However, there are realistically few methods for effectively removing a region where the rubbing is incompletely performed because of the column spacers. The most efficient method is that an incomplete rubbing region (alignment defective region), that is, a region where light leakage occurs, is located at a region where a black matrix is formed. Since such a method can eliminate the alignment defective region by simply blocking the inferior alignment region without changing a structure or a process (because the alignment defective region exists in the pixel), the contrast ratio can be improved without a cost increase or yield deterioration. In addition, since an additional black matrix is not formed but the already formed black matrix blocks the alignment defective region, the contrast ratio can be improved without reducing an aperture ratio.

By changing a location where a column spacer is formed or by changing a shape of a data line, the column spacer is aligned with a black matrix formed along the column spacer to thereby prevent light leakage. In addition, light leakage is prevented by aligning column spacers which are formed not inside a pixel but outside an liquid crystal panel with column spacers inside the pixel, that is, with the black matrix formed along the data line.

Hereinafter, with reference to the accompanying drawings, the present invention will be described in more detail.

Figure 3:
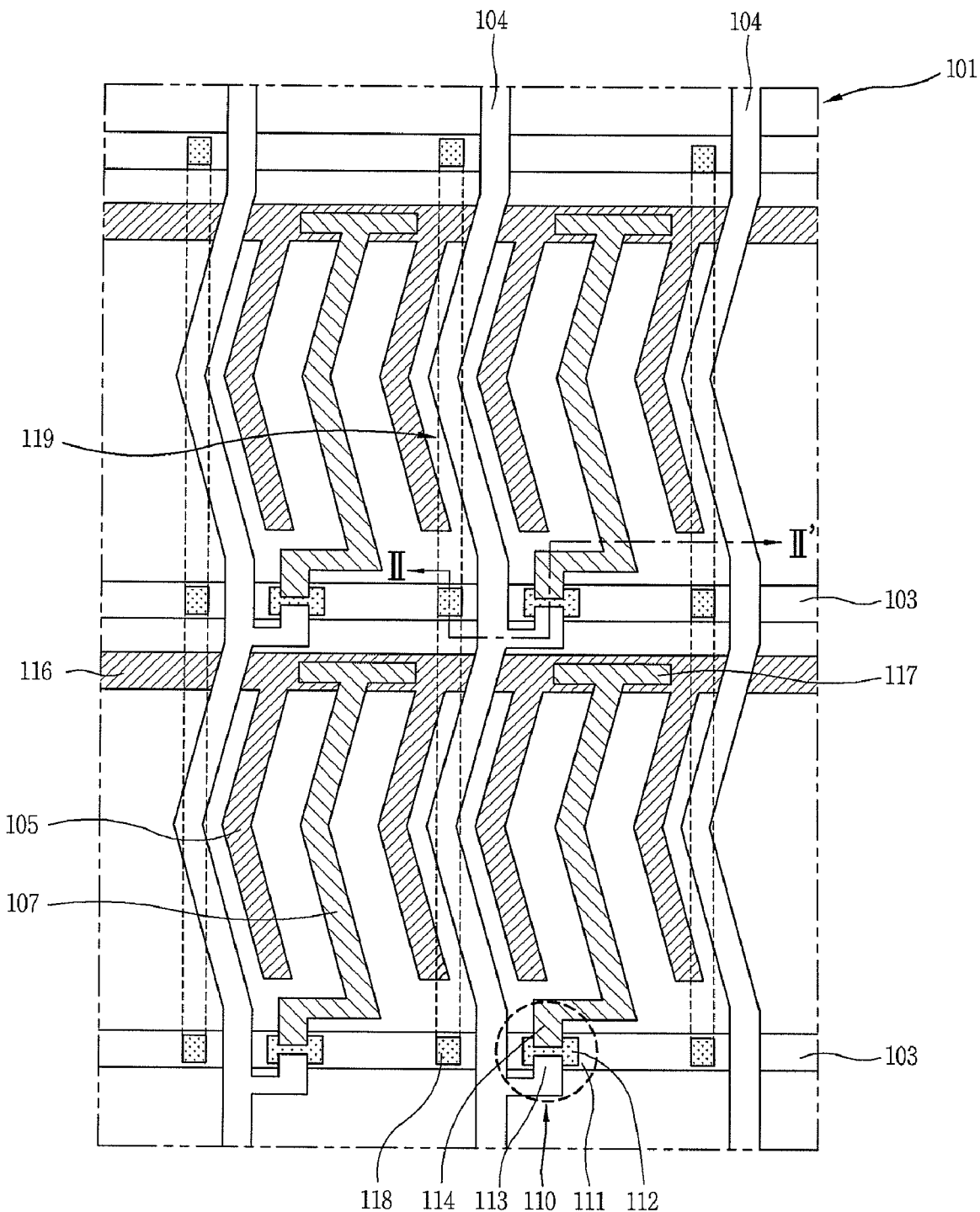
FIG. 3 is a plane view illustrating a structure of an in-plane switching mode in accordance with one embodiment of the present invention.

FIG. 3 is a view illustrating a structure of an IPS-mode liquid crystal display device in accordance with one embodiment of the present invention. As shown in FIG. 3, an IPS-mode liquid crystal display device of the present invention includes a plurality of pixels defined by a plurality of gate lines 103 and a plurality of data lines 104. A thin film transistor 110 which includes a gate electrode 111, a semiconductor layer 112 formed on the gate electrode 111 and forming a channel layer, which is activated when a scan signal is applied, and a source electrode 113 and a drain electrode 114 formed on the semiconductor layer 112 is disposed on the crossing of the gate line 103 and the data line 104 in the pixel.

Figure 1:
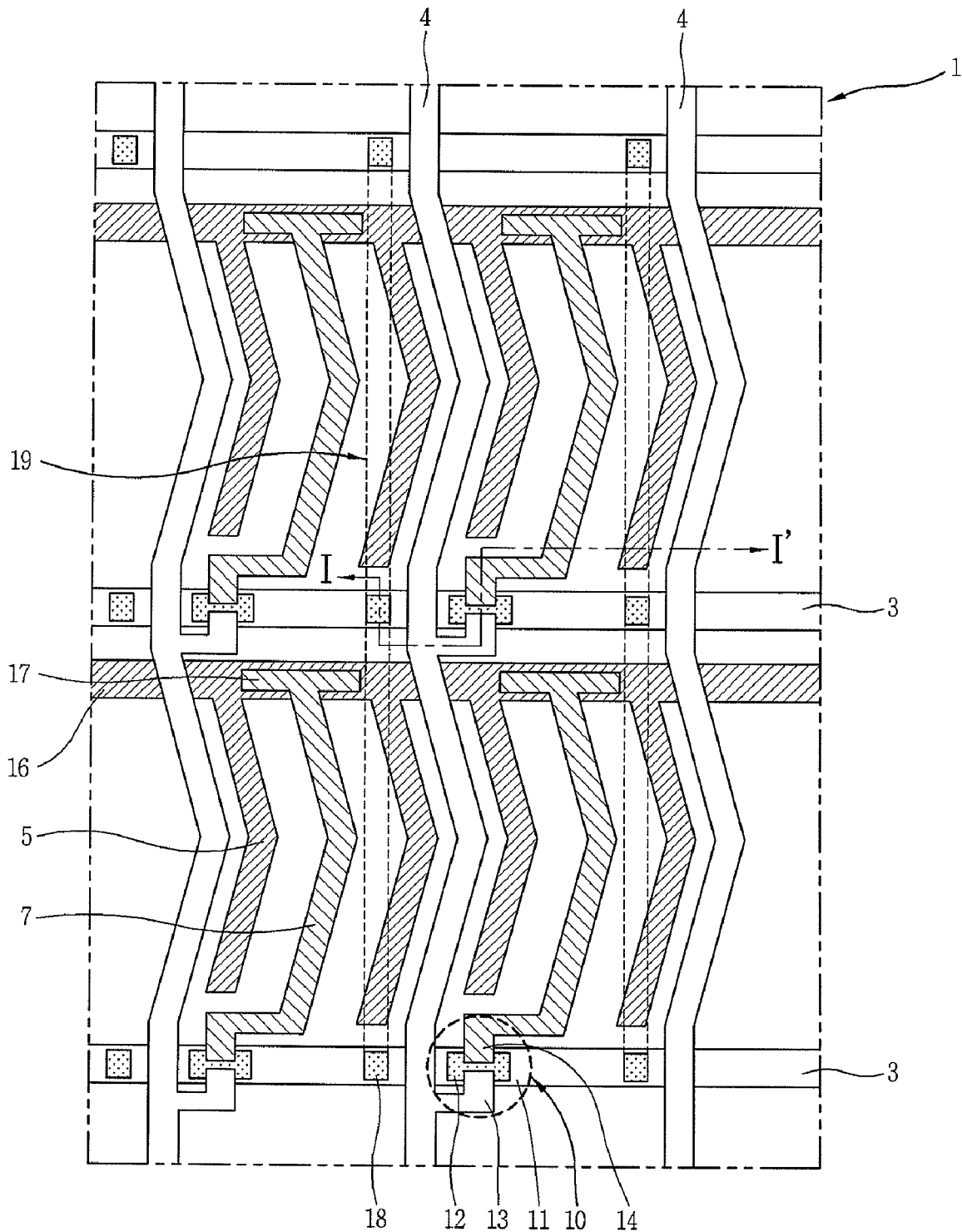
FIG. 1 is a plane view illustrating a structure of an in-plane switching mode in accordance with a related art.

The data line 104 is bent in a zigzag shape to divide a pixel into two domains. That is, the pixel is bent at a certain angle on the basis of the center of the pixel and therefore is symmetric, so that the pixel is divided into two domains which compensate a main viewing angle. The data line 104 has a bending direction opposite to the data line of the related art IPS-mode liquid crystal display device illustrated in FIG. 1. That is, in the related art IPS-mode liquid crystal display device, a bent portion of the data line is convex toward a region where the thin film transistor is formed (i.e., the right region of the data line), while in the present invention, a bent portion of the data line 14 is convex toward a region where the thin film transistor 110 is not formed (i.e., the left region of the data line). In other words, the bending direction of the data line 104 in the present invention is opposite to that of the data line in the related art IPS-mode liquid crystal display device illustrated in FIG. 1.

A common electrode 105 and a pixel electrode 107 substantially parallel with the data line 104 is disposed in the pixel. Like the data line 104, the common electrode 105 and the pixel electrode 107 are also bent to be convex toward the region where the thin film transistor 110 is not formed. In addition, a common line 116 connected to the common electrode 105 is disposed at an upper portion of the pixel. A pixel electrode line 117 connected to the pixel electrode 107 is disposed on the common line 116, so that an accumulated capacity is formed between the common line 116 and the pixel electrode line 117.

As shown in FIG. 3, a column spacer 118 is formed on the gate line 103 on the left of the data line 104. That is, the column spacer 118 is formed on the gate line 103 where the thin film transistor 110 is not formed. Since the column spacer 118 is formed at each pixel, the column spacers are arranged in a line along a direction of the Y-axis on the left side of the data line 104 over the liquid crystal panel 101. The column spacer 118 is formed of a thermosetting resin. The thermosetting resin and the like is applied and then patterned to form the column spacer 118. Formed by the patterning, the column spacer 118 is also referred to as a patterned spacer. At this time, the column spacer 118 may be formed on the first substrate where the thin film transistor 110 is formed or on the second substrate 130 where the black matrix 132 and the color filter layer 134 are formed.

When the liquid crystal panel 101 is rubbed, a region where the rubbing is incompletely performed (i.e., an alignment defective region) is formed on the left side of the data line 104 along a direction where the column spacer 118 is arranged. As a result, light leakage occurs on the liquid crystal panel through the alignment defective region and therefore a light leakage region 119 in a band shape is formed on the left side of the data line 104 in the direction of the Y-axis.

Meanwhile, the common electrodes 105 are arranged adjacent to both sides of the data line 104. The common electrode 105 prevents distortion of a horizontal electric field generated between the common electrode 105 and the pixel electrode 107 by shielding an electric field generated therebetween. Accordingly, since a black matrix (not shown) formed on the data line 104 region blocks not only light transmitted through the data line 104 region but also light transmitted through the common electrode 105 regions disposed at both side surfaces of the data line 104, the black matrix should be formed to cover the common electrodes 105 formed at both side surfaces of the data line 104 as well as the data line 104.

As shown in FIG. 3, the light leakage region 119 is arranged along the data line 104 and the common electrode 105 disposed on the left side of the data line 104. The light leakage region 119 is arranged by the data line 104 whose bent portion protrudes toward the left region (i.e., a region where the thin film transistor is not formed). Such an arrangement of the light leakage region 119 will be clearly shown in comparison with the IPS-mode LCD device in the related art. As the light leakage region 119 is arranged along the data line 104 and the common electrode 105 on the left side of the data line 104, the light leakage region 119 is arranged substantially along the black matrix. Thus, the black matrix blocks light which leaks outside the liquid crystal panel 101.

Figure 2:
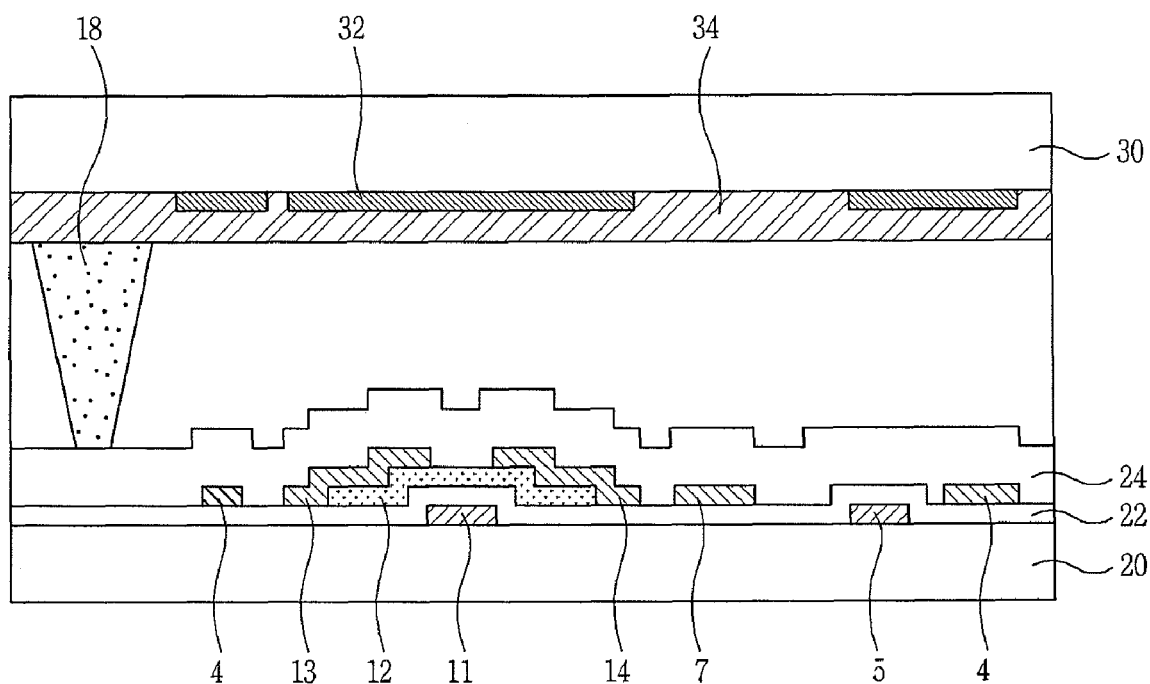
FIG. 2 is a cross-sectional view taken along the line I-I' of FIG. 1.
Figure 4A:
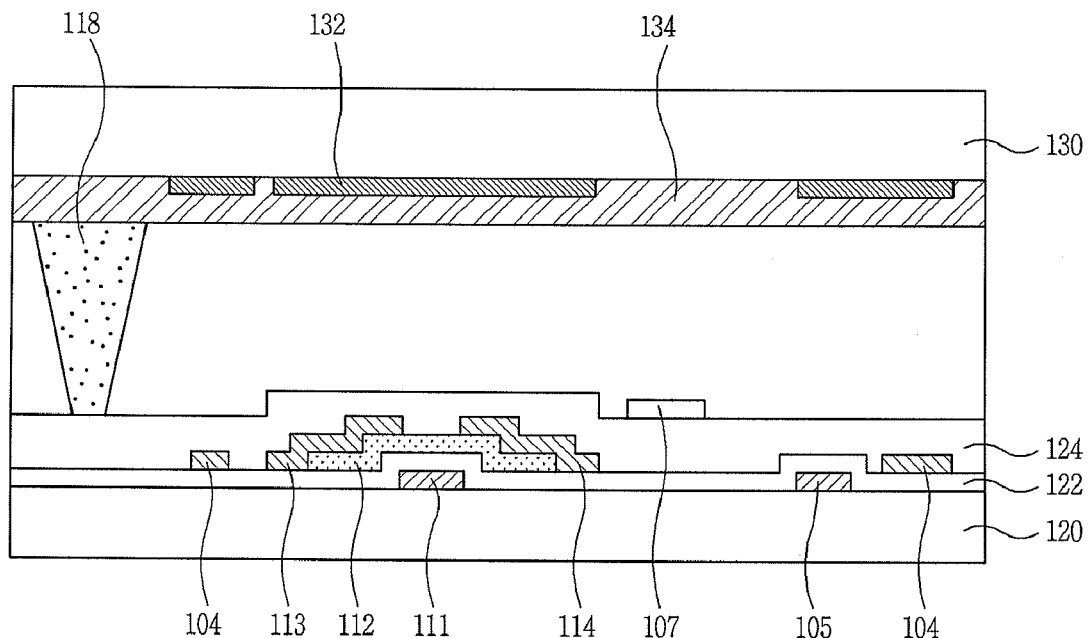
FIG. 4A and FIG. 4B are cross-sectional views taken along the line II-II' of FIG. 3.

Meanwhile, the IPS-mode LCD device in accordance with the present invention has almost the same structure of the IPS-mode LCD device illustrated in FIG. 2, other than a planar structure of the data line 104, the common electrode 105, and the pixel electrode 107. However, the IPS-mode LCD device of the present invention is not limited to such a structure. As shown in FIG. 4a, in the IPS-mode liquid crystal display device of the present invention, the common electrode 105 may be formed on a first substrate 120 by the same process as the gate electrode 111 of the thin film transistor, and the pixel electrode 107 formed of a transparent conductive material such as ITO (Indium Tin Oxide) or IZO (Indium Zinc Oxide) may be formed on the passivation layer 124.

Figure 4B:
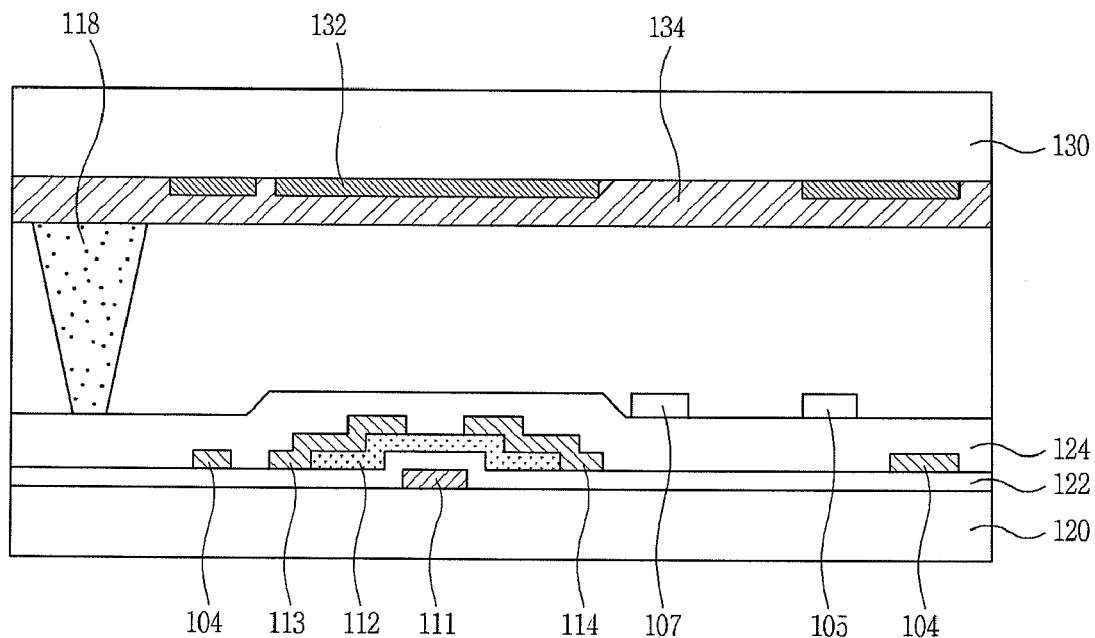

Alternatively, as shown in FIG. 4b, both the common electrode of 105 and the pixel electrode of 107 formed of the transparent conductive material such as ITO (Indium Tin Oxide) or IZO (Indium Zinc Oxide) may be formed on the passivation layer 124. The common electrode 105 and the pixel electrode 107 are formed of the transparent conductive material so as to improve brightness and aperture ratio of the IPS-mode LCD device.

As described, the IPS-mode LCD device in accordance with the present invention can block the light leakage region by the black matrix by allowing bending direction of the data line 104, the common electrode 105 and the pixel electrode 107 to be opposite to that of the IPS-mode LCD device of the related art and aligning the column spacer 118 with the data line 104. Thus, the IPS-mode LCD device in accordance with the present invention can improve the contrast ration of the liquid crystal panel 101.

In terms of alignment of column spacer 118 and the data line 104, when the column spacer is formed on the right side of the data line, not on the left side thereof, that is, when the column spacer is formed on a region where the thin film transistor is formed, the column spacer and the data line are also aligned with each other to thereby block the light leakage region effectively. The liquid crystal display device having this structure can be included as another embodiment of the present invention.

Figure 5:
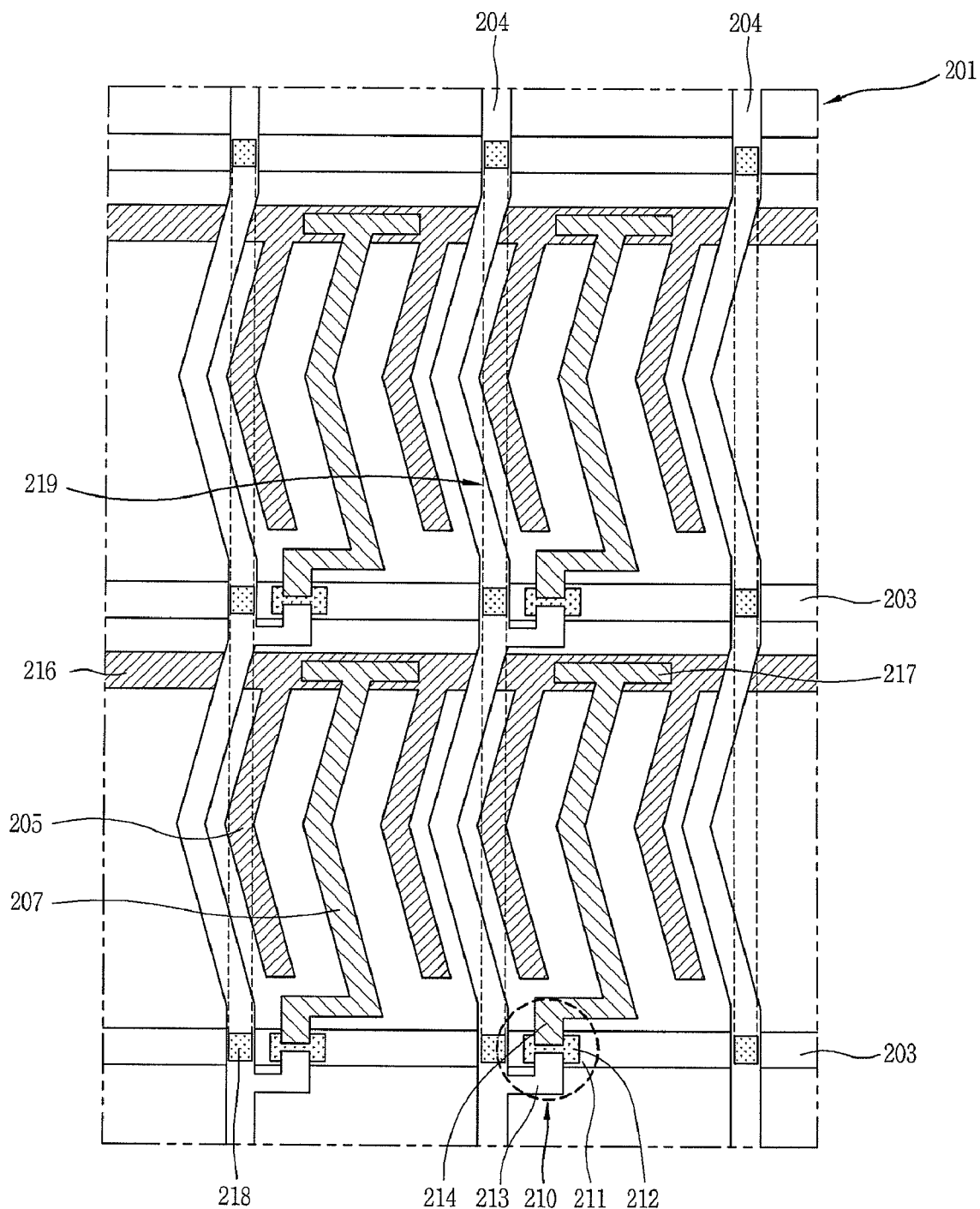
FIG. 5 is a plane view illustrating a structure of an in-plane mode liquid crystal display device in accordance with another embodiment of the present invention.

In addition, in terms of alignment of the data line and the column spacer, or alignment of the black matrix and the column spacer which are formed on the data line region, in which a column spacer 218 is formed at an intersection of a gate line 203 and a data line 204 is shown in FIG. 5. In such a structure, a black matrix formed along the data line 204 can block a light leakage region 219 because the light leakage region 219 formed by the column spacer 218 is disposed along the data line 204.

Figure 6:
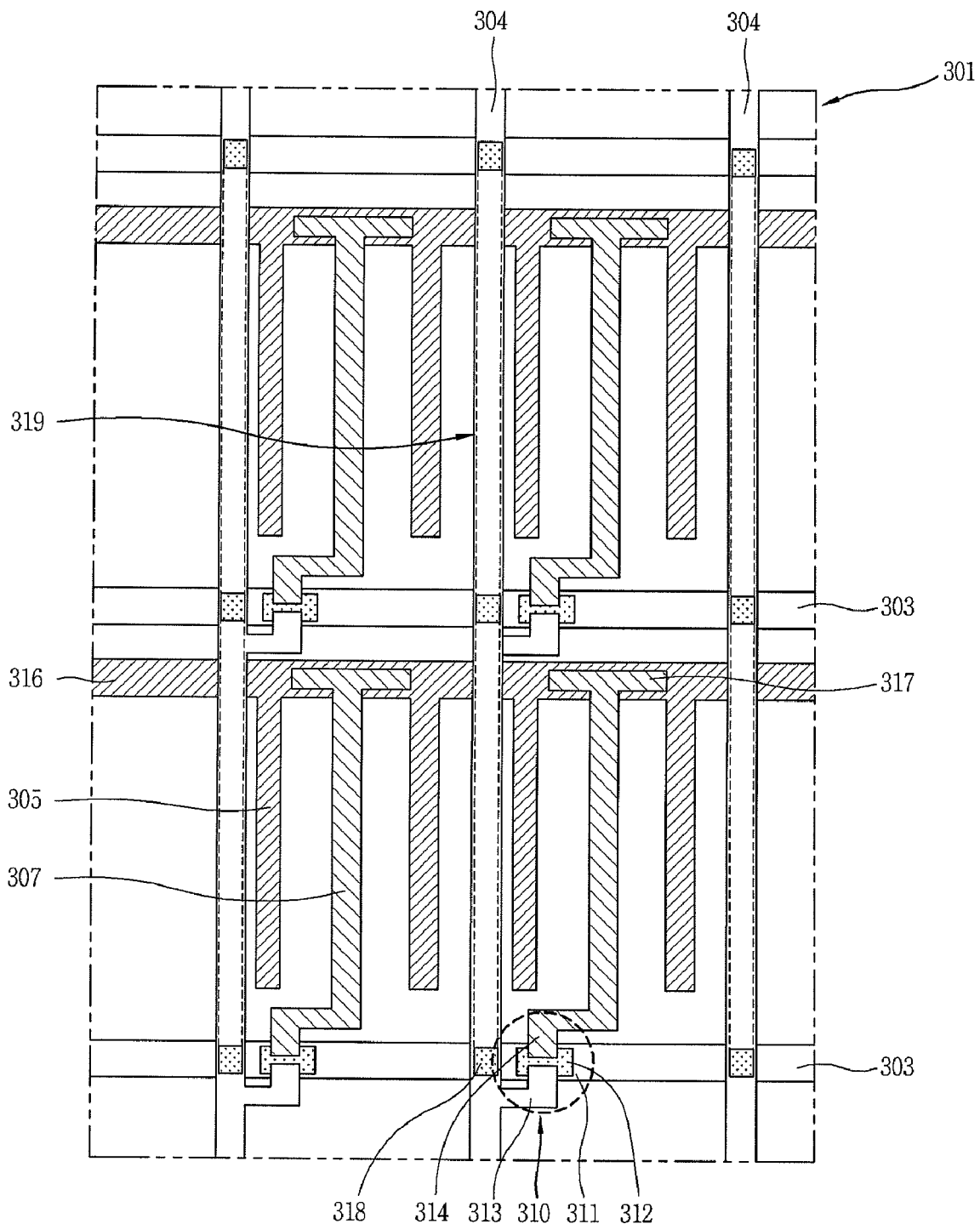
FIG. 6 is a plane view illustrating a structure of an in-plane mode liquid crystal display device in accordance with yet another embodiment of the present invention.

Meanwhile, the IPS-mode LCD device of the present invention is not limited to a bent structure illustrated in FIGS. 3 and 5. FIG. 6 shows an IPS-mode LCD device having a structure in which a data line 304, a common electrode 305 and a pixel electrode 307 are not bent. Since a column spacer 318 is formed at the crossing of a gate line 303 and the data line 304 like the structure illustrated in FIG. 5, a rubbing defective region resulting from the column spacer 318 is formed along the data line 304. Thus, the rubbing defective region is blocked by a black matrix formed long the data line 304, thereby preventing a decrease of a contrast ratio which results from light leakage.

As described, the IPS-mode LCD device of the present invention may have various forms of a data line, a common electrode and a pixel electrode, and besides a column spacer may be disposed at various locations. In addition, the common electrode and the pixel electrode may be also formed on various locations (e.g.; a first substrate, a gate insulating layer or a passivation layer). The IPS-mode LCD device of the present invention, view in this light, is not limited to a specific structure illustrated in the drawings or described above. Though only the IPS-mode LCD device having a two-block (bock means a region where an image is substantially implemented) structure where two common electrodes and one pixel electrode are disposed in a pixel is illustrated in FIGS. 3, 5 and 6, a four-block IPS-mode LCD device where three common electrodes and two pixel electrodes are disposed or a six-block IPS-mode LCD device where four common electrodes and three pixel electrodes are disposed, or an IPS-mode LCD device having more blocks may be included in the present invention.

Meanwhile, processes for fabricating an IPS-mode LCD device is substantially performed on a glass substrate. That is, after a thin film transistor process and a color filter process are performed on the glass substrate where a plurality of liquid crystal panels are formed, the IPS-mode LCD device is completed by separating the glass substrate into unit panels. However, as the demand for a large-area LDC device increases, the glass substrate also increases in size and accordingly in weight. Thus, when processes are performed on a unit of the glass substrate, though the column spacer is formed on a panel region, it is hard to main a desired cell gap, because of the weight of the glass substrate. To solve such a problem, a uniform cell gap of the overall glass substrate, not of the liquid crystal panel, should be maintained by forming a column spacer on a dummy area where the liquid crystal panel is not formed.

Figure 7:
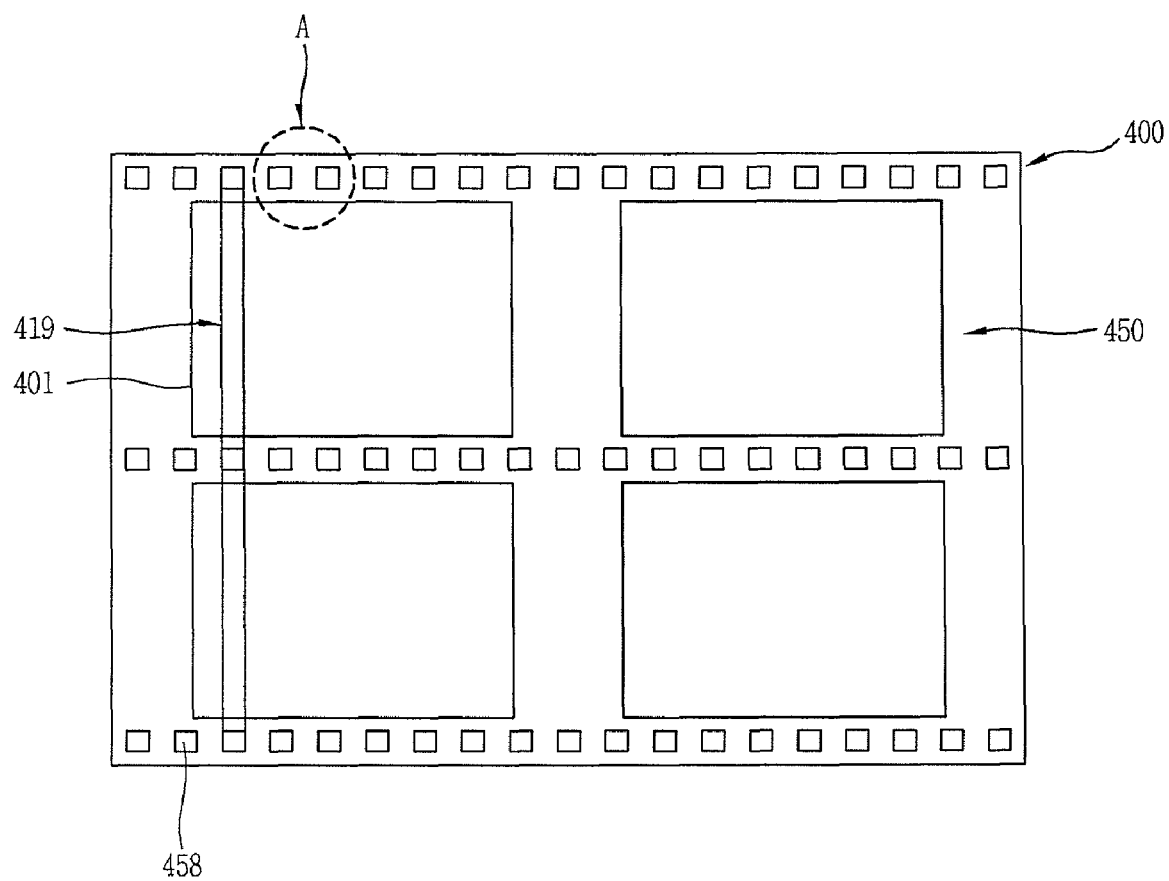
FIG. 7 is view illustrating a large-area glass substrate on which a plurality of IPS-mode liquid crystal panels are formed.

As shown in FIG. 7, a large-area glass substrate 400 where a plurality of liquid crystal panels 401 are formed is illustrated. Though only four liquid crystal panels 401 are formed on the glass substrate 400 in FIG. 7 for the purpose of simplicity, two, six or more liquid crystal panels 401 may be formed on the glass substrate 400.

As shown in FIG. 7, column spacers 458 are formed on a dummy area 450 where the liquid crystal panel 401 is not formed. The column spacers 458 of the dummy area 450 support the glass substrate of the dummy area 450 and maintain a cell gap of the overall glass substrate, thereby maintaining a uniform cell gap inside the liquid crystal panels 401. A rubbing process carried out on an alignment layer formed on the liquid crystal panels 401 is performed by a unit of the glass substrate 400, not by units of one liquid crystal panel 401. In other words, an alignment direction of each liquid crystal panels 401 is determined by rubbing the overall glass substrate 400 by using a large-size rubbing roll. However, since the column spacers 458 are disposed on the dummy area 450 of the glass substrate 400, an alignment defective region 419 is formed by the column spacers 458 during the rubbing. Since the alignment defective region 419 of the dummy area 450 which is formed by the column spacers 458 is formed on the entire glass substrate 400 along a rubbing direction, the liquid crystal panels 401 also has the alignment defective region 419. Accordingly, since the column spacers 458 of the dummy area 450 cause the same problem as the column spacers disposed in the pixel, light leakage due to the column spacers disposed on the dummy area 450 of the glass substrate 400 should be eliminated in order to improve the IPS-mode LCD device in quality.

Figure 8:
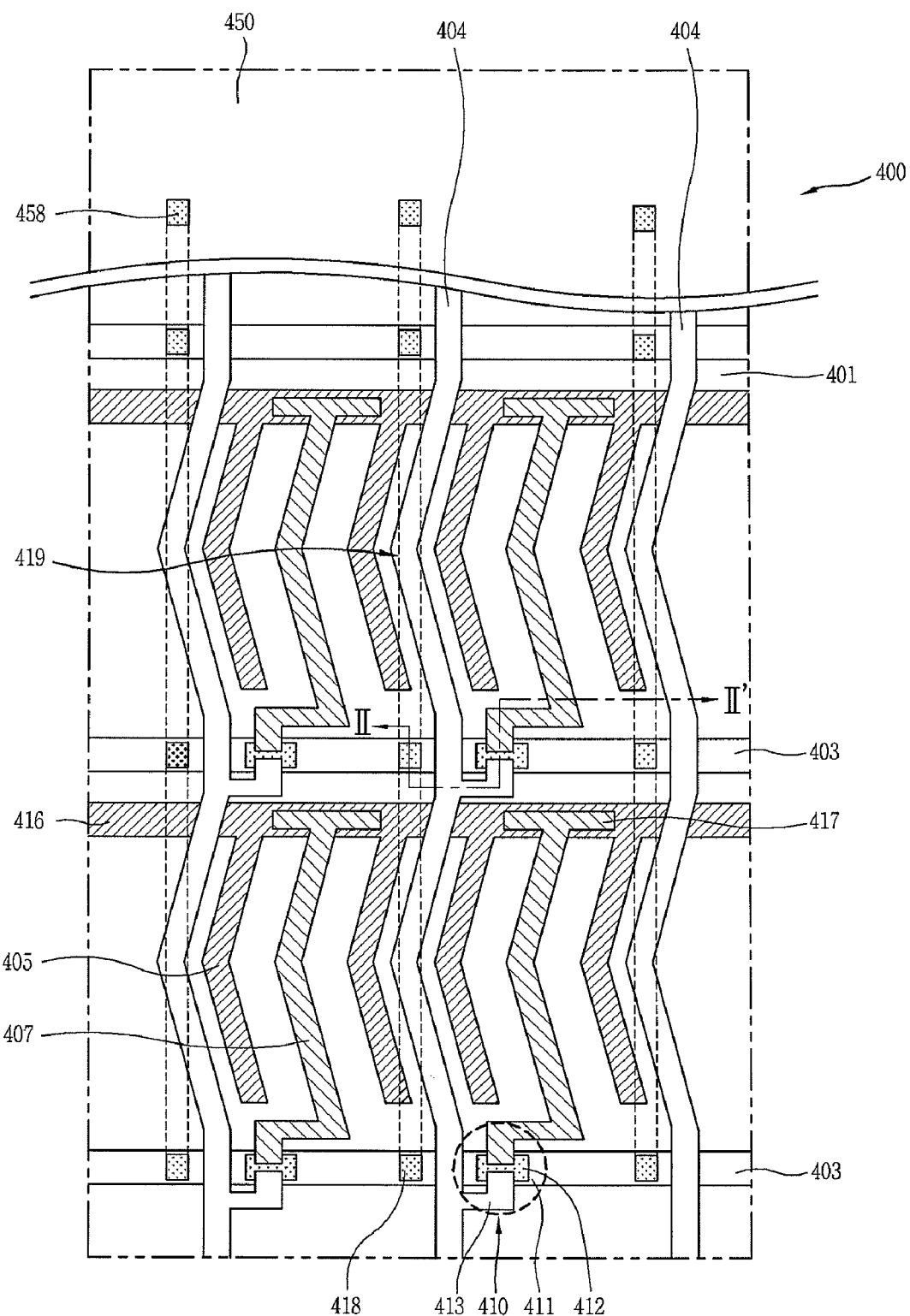
FIG. 8 is an enlarged view of an A part of FIG. 7.

FIG. 8 is an enlarged view of an A area of FIG. 7. As shown in FIG. 8, a plurality of column spacers 458 are formed on the dummy area 450 of the glass substrate adjacent to the liquid crystal panel 401. Although the liquid crystal panel has the structure illustrated in FIG. 3, it may have the structures illustrated in FIGS. 5 and 6. A column spacer 418 is arranged on the left side of a data line 403, that is, on a gate line 404 where a thin film transistor 410 is not formed. The column spacer 458 of the dummy area 450 is also aligned with the column spacer 418 of the liquid crystal panel 401. Accordingly, when a rubbing process is performed on the glass substrate, an alignment defective region resulting from the column spacer 418 of the liquid crystal panel 401 and an alignment defective region resulting from the column spacer 458 of the dummy area are formed on the same location 419 in the pixel.

Meanwhile, since the alignment defective region 419 is disposed along a black matrix formed along a data line 404 (a black matrix formed over the data line 404 and common electrodes 405 at both side surfaces of the data line 404), the black matrix blocks light leakage through the alignment defective region 419. Consequently, a contrast ratio can be improved by removing the light leakage region.

As described, in the present invention, the light leakage region can be effectively eliminated by aligning the column spacer 458 formed on the dummy area 450 of the glass substrate with the column spacer 458 of the liquid crystal panel 401 (i.e., by aligning the column spacer 458 of the dummy area 450 with the black matrix of the liquid crystal panel 401). The column spacer 458 of the dummy area 450 may be formed at various locations according to a structure of the liquid crystal panel 401. In other words, when the liquid crystal panel 401 is formed of the structure of FIG. 5 or 6, a location where the dummy area 450 is formed may change according to a location of the column spacer 418 formed on the panel having the corresponding structure.

Since the column spacer 418 formed on the liquid crystal panel 401 is aligned with the data line 404, the column spacer 458 of the dummy area 450 which is aligned with the column spacer 418 may be considered to be aligned with the data line 404 of the liquid crystal panel 401, strictly speaking, with the black matrix formed along the data line 404.

As described so far, since a column spacer formed on a liquid crystal panel and a column spacer of a dummy area are aligned with a black matrix formed along a data line, a light leakage region resulting from an alignment defective region by the column spacer is blocked by the black matrix. As a result, light leakage occurring on a screen can be blocked in a normally black mode, thereby improving a contrast ratio of an IPS-mode LCD device.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An in-plane mode display device comprising:
   a first substrate and a second substrate;
   a plurality of gate lines on the first substrate;
   a plurality of data lines substantially perpendicularly crossing the gate lines to define a plurality of pixels;
   a switching device at each pixel in a set of pixels;
   at least one pair of electrodes in each pixel in the set of pixels to form a horizontal electric field substantially parallel with a surface of the first substrate; and
   a plurality of column spacers between the first substrate and the second substrate to maintain a uniform cell gap between the first substrate and the second substrate, column spacers being disposed along a line disposed at one side of the data line,
   wherein the line is substantially perpendicular to the gate lines and the data line is bent so the line is overlapped with the bend portion of the data line.

2. The device of claim 1, wherein the column spacers of the set of pixels are formed on the gate lines.

3. The device of claim 1, wherein the column spacer and the switching device most proximate to the data line in each pixel of the set of pixels are disposed on opposite sides of the data line.

4. The device of claim 1, further comprising other column spacers formed on a dummy area where pixels are not formed and aligned with the column spacers of the set of pixels.

5. The device of claim 1, further comprising:
   a black matrix on the second substrate to block light transmitted to an image non-display area;
   a color filter layer on the second substrate; and
   a liquid crystal layer between the first substrate and the second substrate.

6. The device of claim 5, wherein the black matrix overlaps at least a portion of an alignment defective region formed by the column spacers.

7. The device of claim 1, further comprising a passivation layer formed on the first substrate, the passivation layer disposed on a first electrode of the pair of electrodes and a second electrode of the pair of electrodes disposed on the passivation layer.

8. The device of claim 1, further comprising a passivation layer formed on the first substrate, the pair of electrodes disposed on the passivation layer.

* * * * *